United States Patent
Suen et al.

(10) Patent No.: US 8,457,398 B2
(45) Date of Patent: Jun. 4, 2013

(54) IMAGE ENHANCEMENT METHOD AND APPARATUSES UTILIZING THE SAME

(75) Inventors: Wei-Ting Suen, Tainan County (TW); Shing-Chia Chen, Tainan County (TW)

(73) Assignee: Himax Media Solutions, Inc., Sinshih Township, Tainan County (TW)

( * ) Notice: Subject to any disclaimer, the term of this patent is extended or adjusted under 35 U.S.C. 154(b) by 830 days.

(21) Appl. No.: 12/606,524

(22) Filed: Oct. 27, 2009

(65) Prior Publication Data

US 2011/0096988 A1 Apr. 28, 2011

(51) Int. Cl.
*G06K 9/00* (2006.01)
*G06K 9/40* (2006.01)

(52) U.S. Cl.
USPC .......................... 382/168; 382/274; 382/260

(58) Field of Classification Search
USPC .......................... 382/168, 274, 260
See application file for complete search history.

(56) References Cited

U.S. PATENT DOCUMENTS

| | | | |
|---|---|---|---|
| 7,684,639 B2 * | 3/2010 | Zhao et al. | 382/274 |
| 8,086,065 B2 * | 12/2011 | Shi | 382/274 |
| 2007/0009175 A1 * | 1/2007 | Lim et al. | 382/275 |
| 2007/0286522 A1 * | 12/2007 | Moesle | 382/274 |
| 2008/0101719 A1 * | 5/2008 | Lim et al. | 382/274 |
| 2008/0240555 A1 * | 10/2008 | Nanu et al. | 382/167 |
| 2008/0285853 A1 * | 11/2008 | Bressan | 382/169 |
| 2010/0008574 A1 * | 1/2010 | Ishiga | 382/167 |
| 2010/0278423 A1 * | 11/2010 | Itoh et al. | 382/169 |

* cited by examiner

*Primary Examiner* — Michelle Entezari

(74) *Attorney, Agent, or Firm* — McClure, Qualey & Rodack, LLP

(57) ABSTRACT

An image enhancement apparatus is provided. The image enhancement apparatus includes a global contrast curve generator, a local contrast curve generator and an image generator. The global contrast curve generator generates a global contrast curve for an input image according to a global histogram of the input image. The local contrast curve generator generates a local contrast curve for each image partition within the input image according to the global contrast curve and further a feature of the image partition. The image generator generates an output image by enhancing a contrast of each image partition according to the local contrast curve for the image partition and the input image, and merging the enhanced image partitions.

9 Claims, 13 Drawing Sheets

| -1 | -1 | -1 |
|----|----|----|
| -1 | 8  | -1 |
| -1 | -1 | -1 |

FIG. 5a

| $C_{-2}$ | $C_{-1}$ | $C_0$ | $C_1$ | $C_2$ |
|----------|----------|-------|-------|-------|

FIG. 5b

IMAGE ENHANCEMENT METHOD AND APPARATUSES UTILIZING THE SAME

BACKGROUND OF THE INVENTION

1. Field of the Invention

The invention relates to an image processing method, and more particularly to an image processing method of contrast enhancement.

2. Description of the Related Art

Contrast is the difference in visual properties that makes an object (or its representation in an image) distinguishable from other objects and the background. In visual perception of the real world, contrast is determined by the difference in the color and brightness of the object and other objects within the same field of view. Contrast enhancement is one of the image enhancement techniques to enhance the contrast presents in an image based on a contrast curve. Global contrast enhancement is to uniformly adjust the contrast of each pixel of the image according to a global contrast curve. However, local features are often sacrificed when the features are small with corresponding pixel values not dominating the average pixel value of the image. Local contrast enhancement is another image enhancement technique to divide the image into several local partitions (i.e. blocks) and enhance the contrast of each image partition independently. Local features in each image partition are preserved due to the merit of the locally enhanced contrasts. However, the output image may not be satisfactory because of lacking a global view of the image.

Therefore, a contrast enhancement method giving consideration to both the global and local characteristics of an image to generate a satisfactory enhancement result is highly required.

BRIEF SUMMARY OF THE INVENTION

Image enhancement apparatus and image enhancement method are provided. An exemplary embodiment of an image enhancement apparatus comprises a global contrast curve generator, a local contrast curve generator and an image generator. The global contrast curve generator generates a global contrast curve for an input image according to a global histogram of the input image. The local contrast curve generator generates a local contrast curve for each image partition within the input image according to the global contrast curve and further a feature of the image partition. The image generator generates an output image by enhancing a contrast of each image partition according to the local contrast curve for the image partition and the input image, and merging the enhanced image partitions.

An exemplary embodiment of an image enhancement method comprising: generating a global contrast curve for an input image according to a global histogram of the input image; generating a local contrast curve for each image partition within the input image according to the global contrast curve and further a feature for the image partition; and generating an output image by enhancing a contrast of each image partition according to the local contrast curve of the image partition and the input image, and merging the enhanced image partitions.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 5a shows an exemplary 2-D high pass filter according to an embodiment of the invention;

FIG. 5b shows an exemplary 1-D filter according to an embodiment of the invention;

FIG. 6b shows the obtained feature values of each image block of the input image shown in FIG. 6a;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
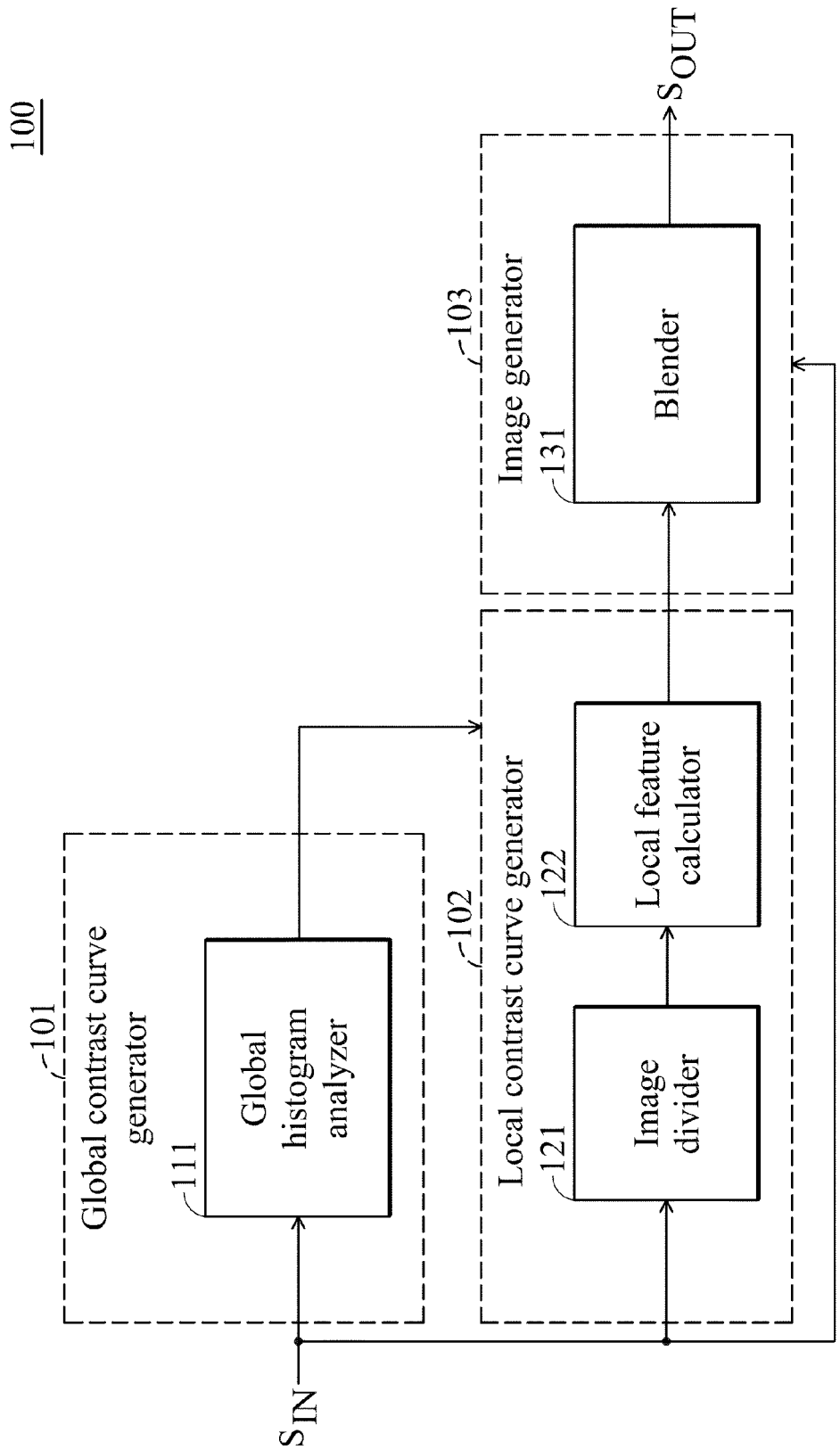
FIG. 1 is a block diagram of an image processing apparatus according to an embodiment of the invention.

FIG. 1 is a block diagram of an image processing apparatus according to an embodiment of the invention. The image processing apparatus 100 comprises a global contrast curve generator 101, a local contrast curve generator 102 and an image generator 103. The global contrast curve generator 101 is arranged to receive an input image $S_{IN}$, generate a global contrast curve for the input image $S_{IN}$ according to a global histogram of the input image. The local contrast curve generator 102 is arranged to receive the input image $S_{IN}$, generates a local contrast curve for each image partition within the input image $S_{IN}$ according to the global contrast curve and further a feature of the image partition. The image generator 103 is arranged to generating an output image $S_{OUT}$ by enhancing a contrast of each image partition according to the local contrast curve for the image partition and the input image, and merging the enhanced image partitions.

Figure 2:
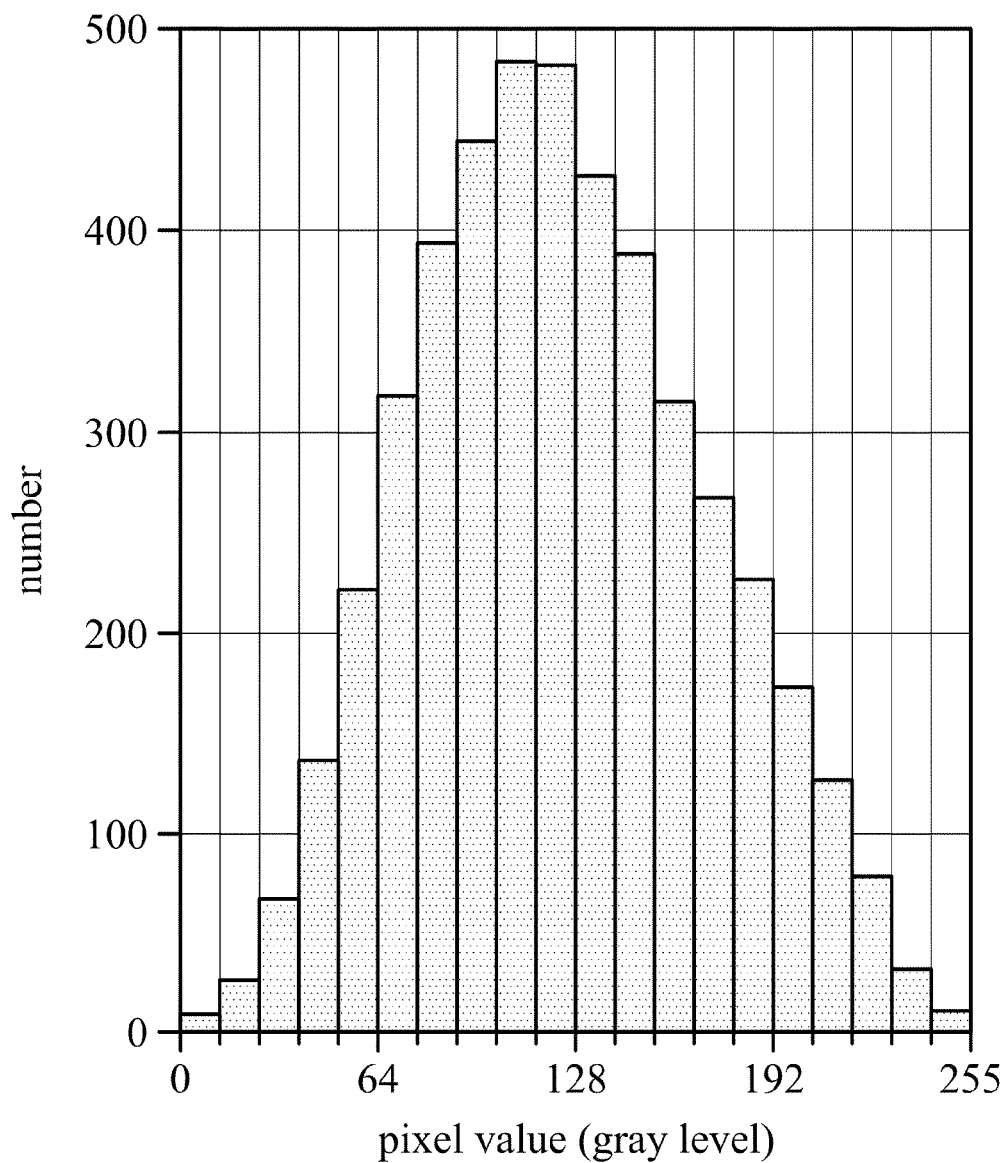
FIG. 2 shows an exemplary histogram according to an embodiment of the invention.
Figure 3:
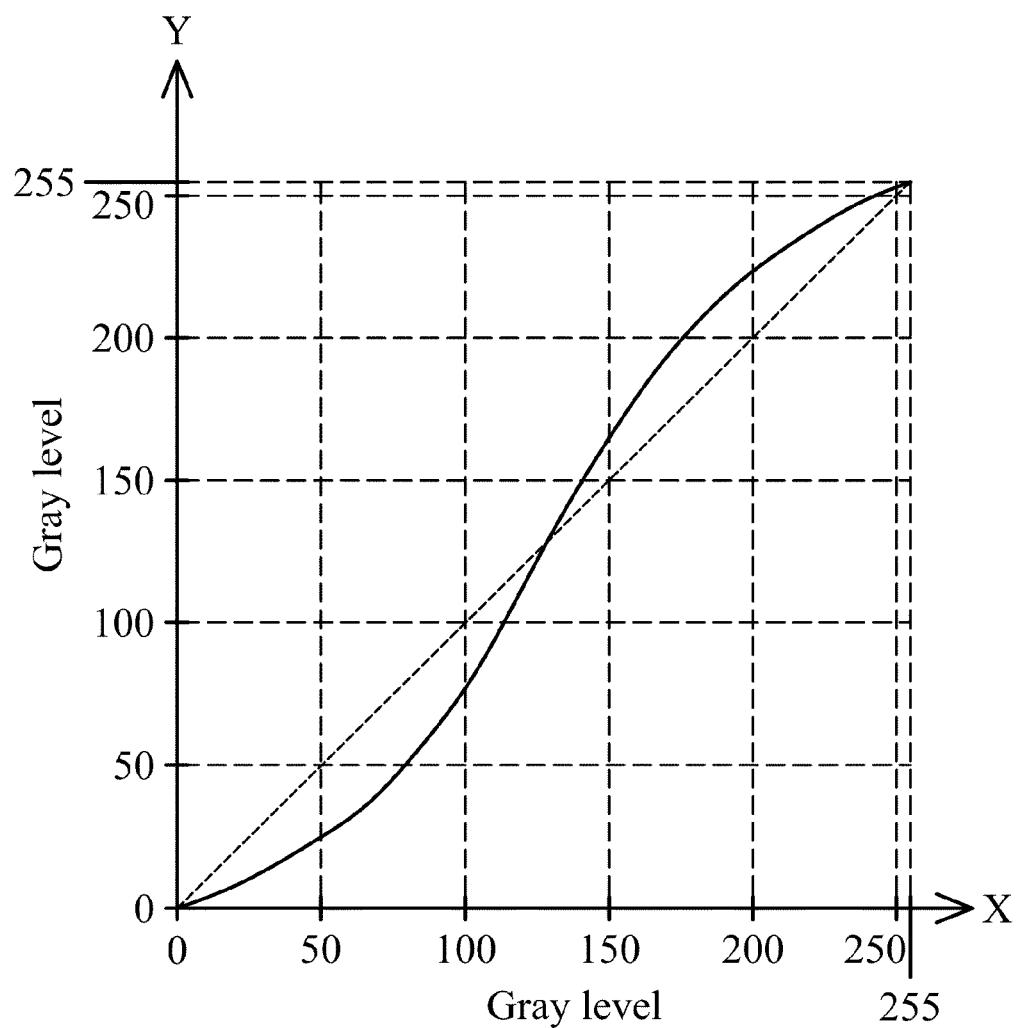
FIG. 3 shows an exemplary S-curve for contrast enhancement according to an embodiment of the invention.

As shown in FIG. 1, the global contrast curve generator 101 comprises a global histogram analyzer 111. The global histogram analyzer 111 is arranged to obtain a global histogram of the input image. A histogram utilized in the image processing scope is a statistic table representing the pixel value (e.g. gray level) versus a corresponding amount of pixels within the image. FIG. 2 shows an exemplary histogram according to an embodiment of the invention. As can be seen, the histogram 200 having the X-axis for the pixel value and the Y-axis for the number of the pixel value exhibits pixel value distribution of the corresponding image. The global contrast curve generator 101 is arranged to generate a global contrast curve of the input image according to the global histogram. According to an embodiment of the invention, the global contrast curve may be an S-shaped characteristic curve (hereinafter called S-curve). FIG. 3 shows an exemplary S-curve for contrast enhancement according to an embodiment of the invention. The X-axis represents the input pixel value and the Y-axis represents the output pixel value. Based on the S-curve, the pixel values of the image may be adjusted according to the X-Y relationship described by the S-curve. According to an embodiment of the invention, the global contrast curve generator 101 may generate the global contrast curve of the input image by performing histogram equalization.

Figure 4:
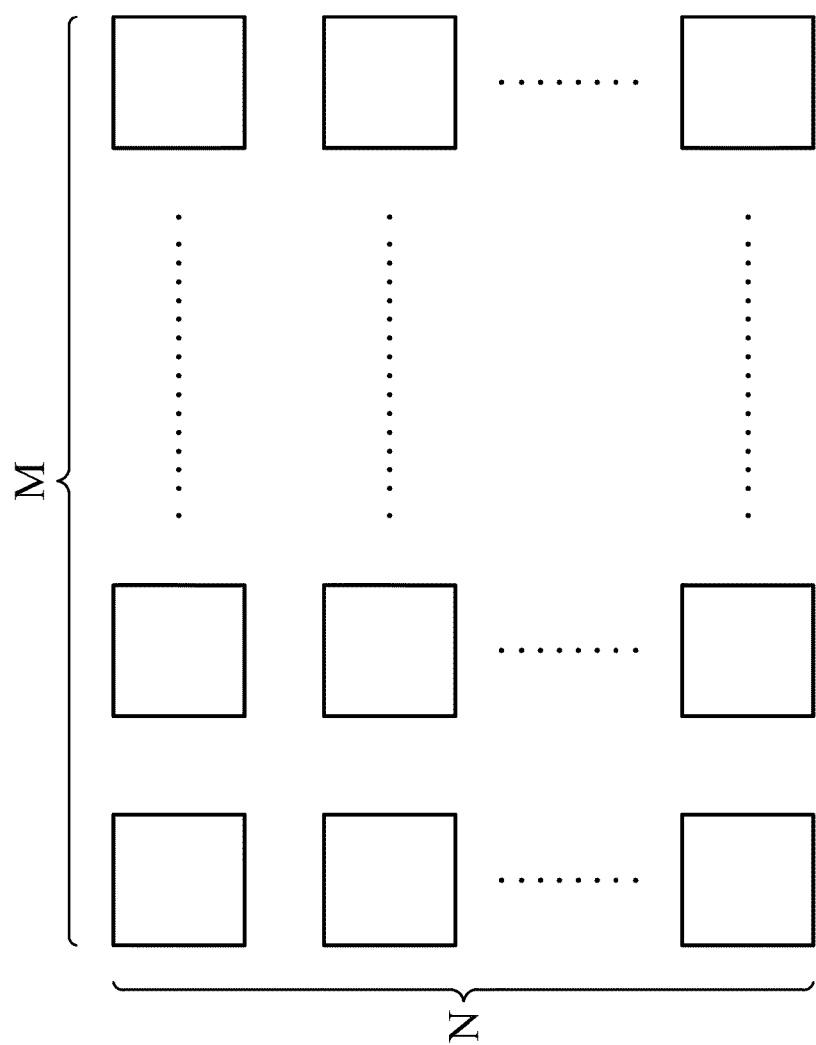
FIG. 4 shows exemplary image partitions according to an embodiment of the invention.
Figures 5A, 5B:
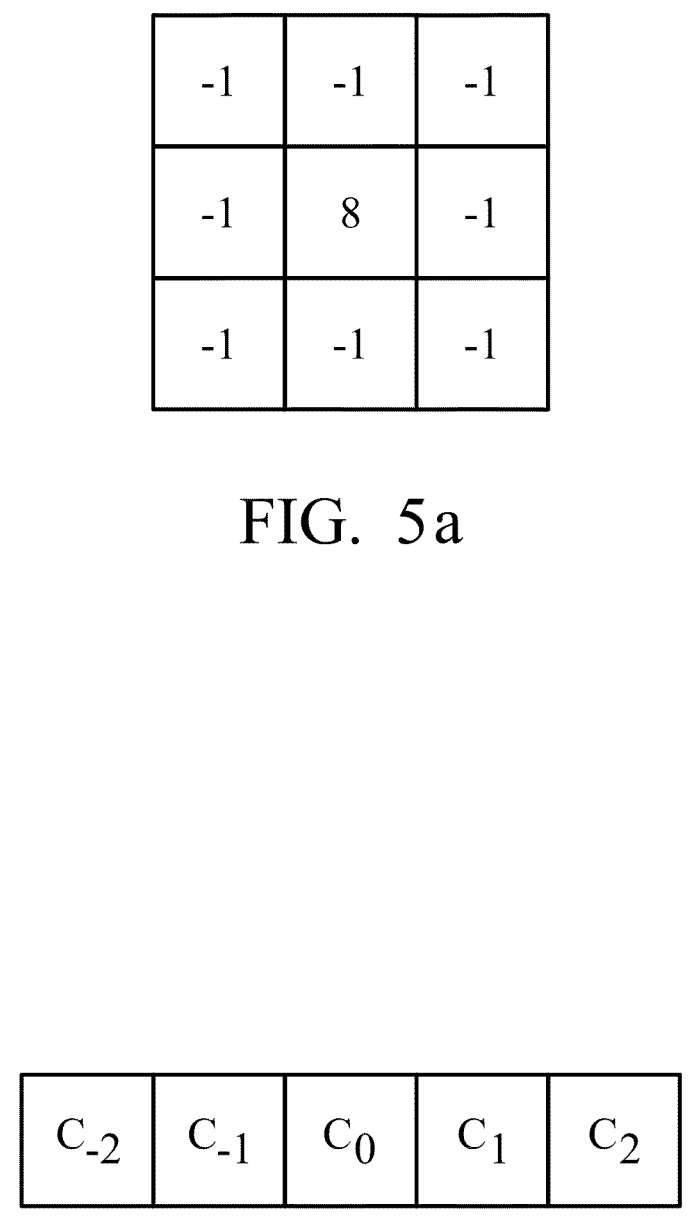

The local contrast curve generator 102 comprises an image divider 121 and a local feature calculator 122. The image divider 121 is arranged to divide the input image into several smaller image partitions (i.e. image blocks). FIG. 4 shows exemplary image partitions according to an embodiment of the invention. As shown in FIG. 4, the input image is divided into M×N image partitions. The local feature calculator 122 is arranged to filter the image partitions by using a predetermined filter to obtain a feature value for each image partition. According to an embodiment of the invention, the predetermined filter may be a high pass filter. FIG. 5a shows an exemplary 2-D high pass filter according to an embodiment of the invention. FIG. 5b shows an exemplary 1-D filter with a window length of 5 pixels according to another embodiment of the invention. Pixel values of the pixels within the window may be multiplied by the coefficients $C_0$, $C_{-1}$, $C_1$, $C_{-2}$ and $C_2$ and a summation of the multiplication results may be obtained as the filtered value of the central pixel.

Figure 6A:
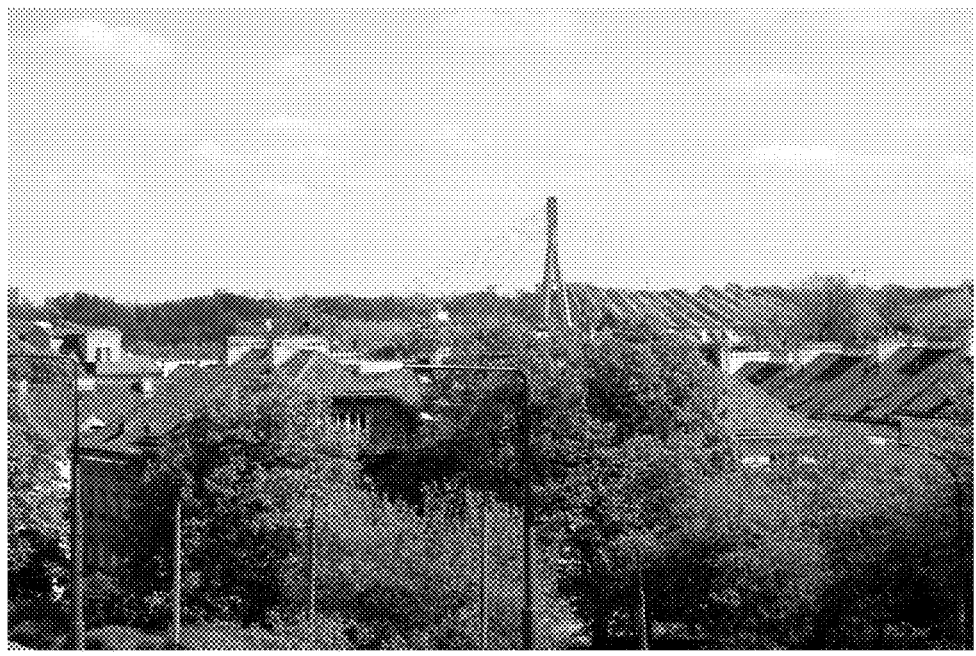
FIG. 6a shows an exemplary input image according to an embodiment of the invention.
Figure 6B:
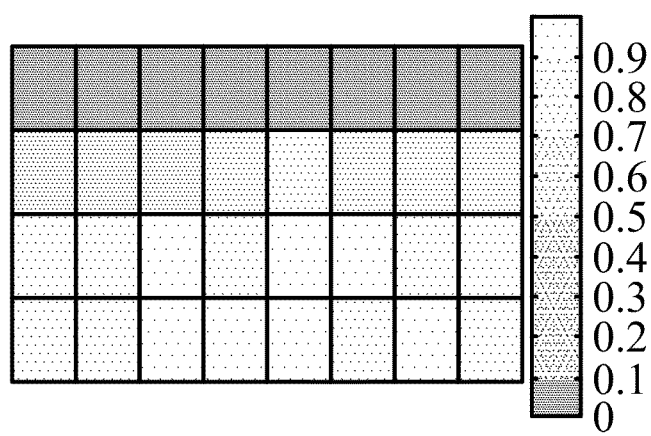

According to an embodiment of the invention, the local feature calculator 122 may obtain the filtered value of each pixel within an image partition by filtering the pixel with the predetermined filter, and obtain the feature value of the image partition according to the obtained filtered value of each pixel within the image partition. As an example, the feature value of the image partition is to sum up the filtered values of the pixels within the image partition. In the embodiments of the invention, the purpose of the local feature calculation is to calculate the amount of details of the local image partitions. FIG. 6a shows an exemplary input image according to an embodiment of the invention. As shown in FIG. 6a, in contrast to the lower half of the input image, the upper half of the input image is the sky with less details and edges. FIG. 6b shows the obtained feature value of each image partition of the input image shown in FIG. 6a. According to the embodiments of the invention, the feature values may be normalized and distributed within 0~1. A smaller feature value may represent that there are fewer details or edges in the corresponding image partition.

After obtaining the feature value of the image partitions, the local contrast curve generator 102 may generate a local contrast curve for each image partition according to the corresponding feature value of the image partition and the global contrast curve. According to an embodiment of the invention, the local contrast curve generator 102 may generate the local contrast curves of the image partitions by adjusting a curvature of the global contrast curve according to the corresponding feature values. Referring back to FIG. 3 and FIG. 6b, in some embodiments of the invention, the local contrast curve generator 102 may tune the curvature of the global contrast curve shown in FIG. 3 respectively according to the normalized feature values of image partitions shown in FIG. 6b so as to generate a local contrast curve for each image partition. As an example, the curvature of the global contrast curve may be regarded as a maximum curvature of the input image. For each image partition, the local contrast curve generator 102 may reduce the curvature of the global contrast curve according to the normalized feature value of the image partition. The smaller feature value represents the larger reduction of the curvature to be taken. In other words, the obtained curvature of the local image partition may close to the curvature of the global contrast curve (the maximum curvature) when the normalized feature value closes to the value of one.

Figure 7A:
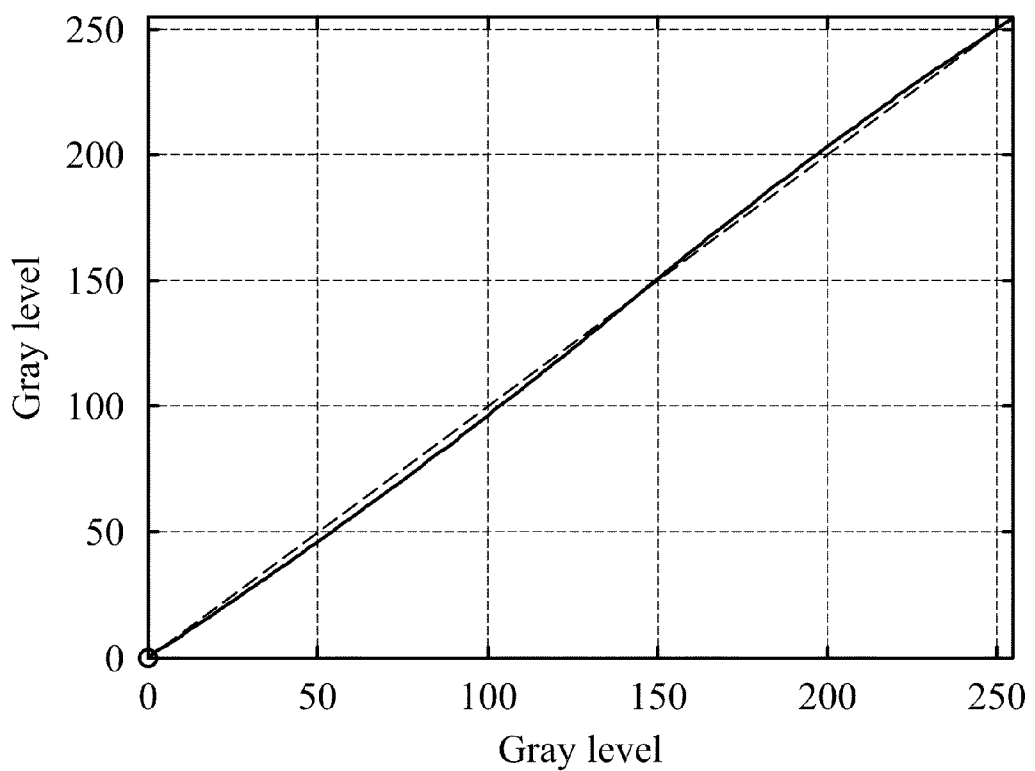
FIGS. 7a-7d shows four local contrast curves according to an embodiment of the invention.
Figure 7B:
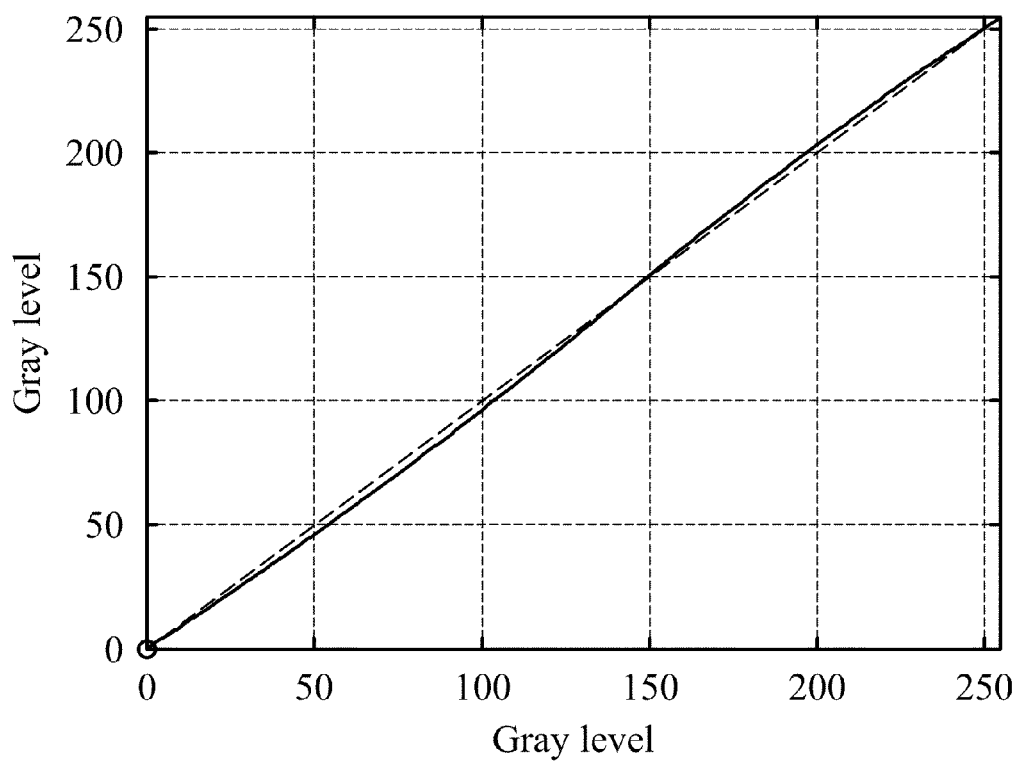
Figure 7C:
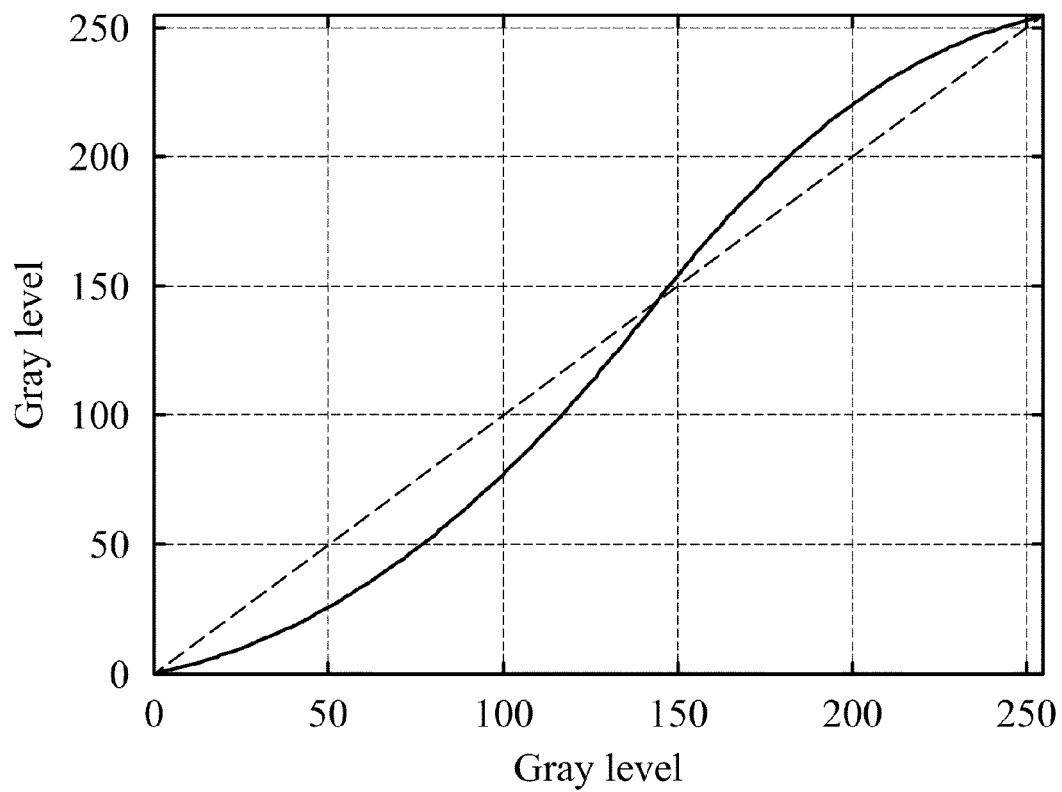
Figure 7D:
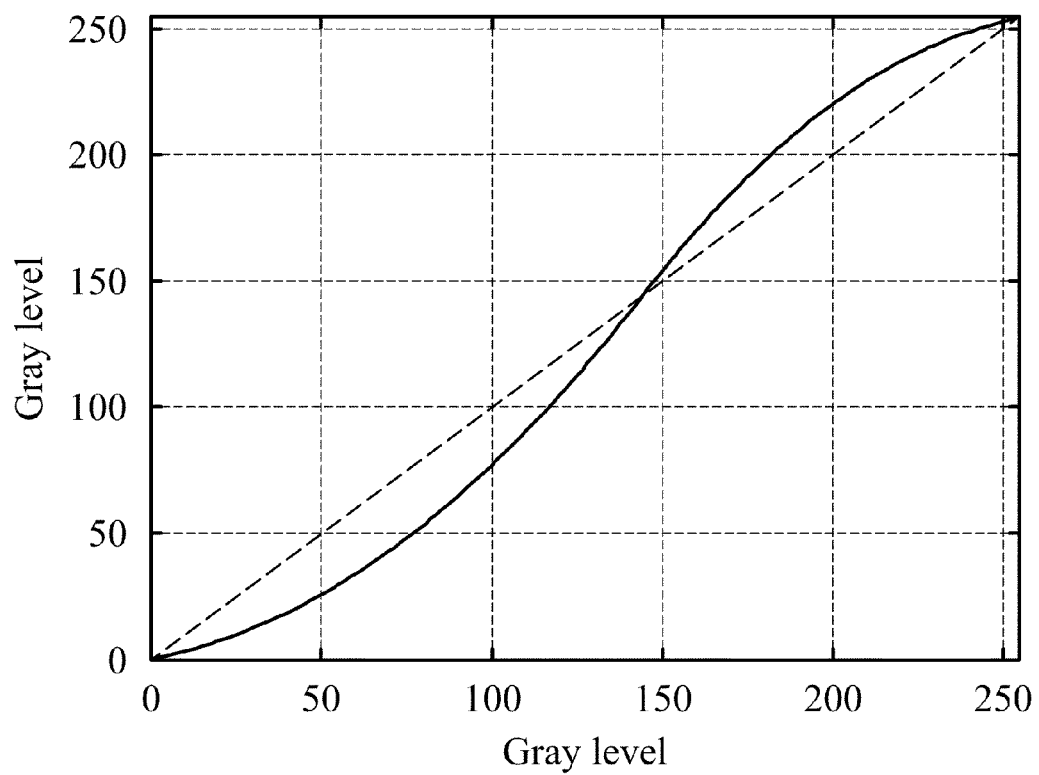

FIGS. 7a-7d shows four local contrast curves according to an embodiment of the invention. In this embodiment, the input image as shown in FIG. 6a is equally divided into four image partitions for simplicity. The feature values of the image partitions located in the upper half of the input image are close to zero and the feature values of the image partitions located in the lower half of the input image are close to one. The local contrast curves in FIGS. 7a-7d are obtained respectively according to their feature values. FIG. 7a shows the local contrast curve of the image partition located in the left and upper half of the input image. FIG. 7b shows the local contrast curve of the image partition located in the right and upper half of the input image. FIG. 7c shows the local contrast curve of the image partition located in the left and lower half of the input image. FIG. 7d shows the local contrast curve of the image partition located in the right and lower half of the input image. Therefore, the four local contrast curves shown in FIGS. 7a to 7d respectively shows the obtained curvatures of the local contrast curves of the corresponding image partitions. As shown FIGS. 7c and 7d, the obtained curvatures of the local contrast curves of the image partitions located in the lower half of the input image may be larger than those of the image partitions located in the upper half of the input image as shown FIGS. 7a and 7b. Therefore, the contrasts of the image partitions located in the lower half with more details may be given more enhancement than the contrasts of the image partitions located in the lower half with fewer details. Note that the reduction of curvature as described above is just one of the embodiments of the invention and the invention is not limited thereto. Those who are skilled in this technology can still make various alterations and modifications without departing from the scope and spirit of this invention to achieve substantially similar concept or the substantially same function of the invention. Therefore, the scope of the present invention shall be defined and protected by the following claims and their equivalents.

Figure 8:
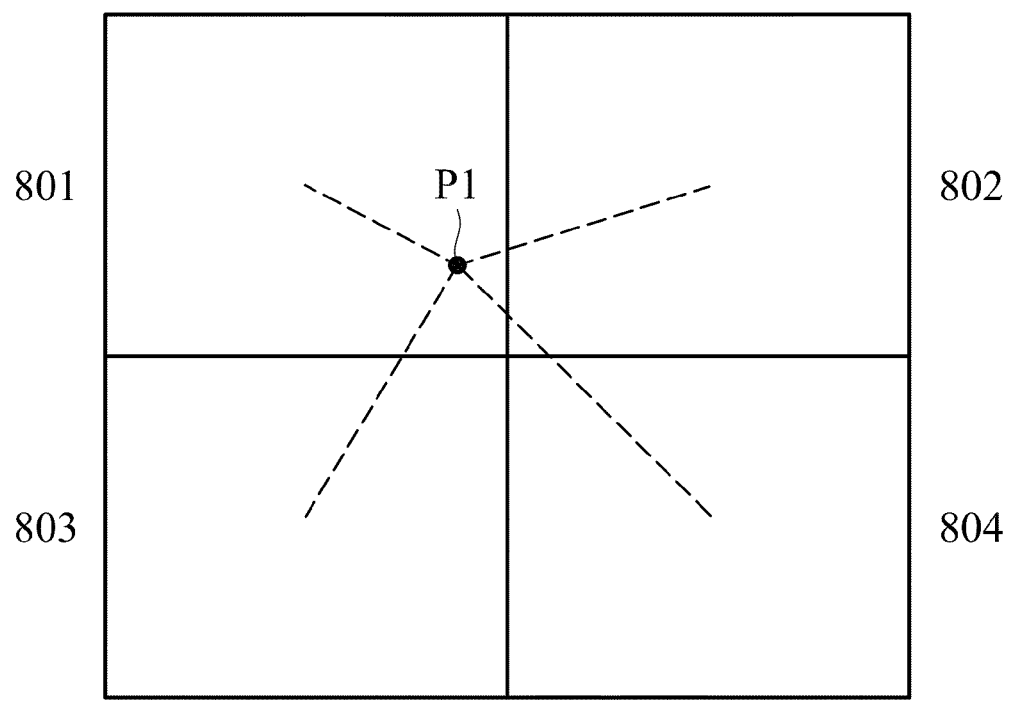
FIG. 8 shows four image partitions illustrating the blending concept according to an embodiment of the invention.

The image generator 103 comprises a blender 131. For a pixel within an image partition, the blender 131 is arranged to blend the local contrast curves of the image partition and image partitions adjacent to the pixel to obtain a contrast adjusting value for the pixel. According to an embodiment of the invention, the blender 131 obtains the contrast adjusting value by blending the local contrast curves of the image partition and the image partitions adjacent to the pixel with a plurality of weightings. The weighting of the image partition or each adjacent image partition may be determined according to a distance between the pixel and image partition or the corresponding adjacent image partition. FIG. 8 shows four image partitions illustrating the blending concept according to an embodiment of the invention. As shown in FIG. 8, the contrast adjusting value of the pixel P1 within the image partition 801 may be obtained by blending the local contrast curves of the image partition 801 and the adjacent image partitions 802, 803 and 804. The weightings utilized for blending the local contrast curves may be determined according to the distance between the pixel P1 and the center of the image partition and the corresponding adjacent image partitions.

Figure 9:
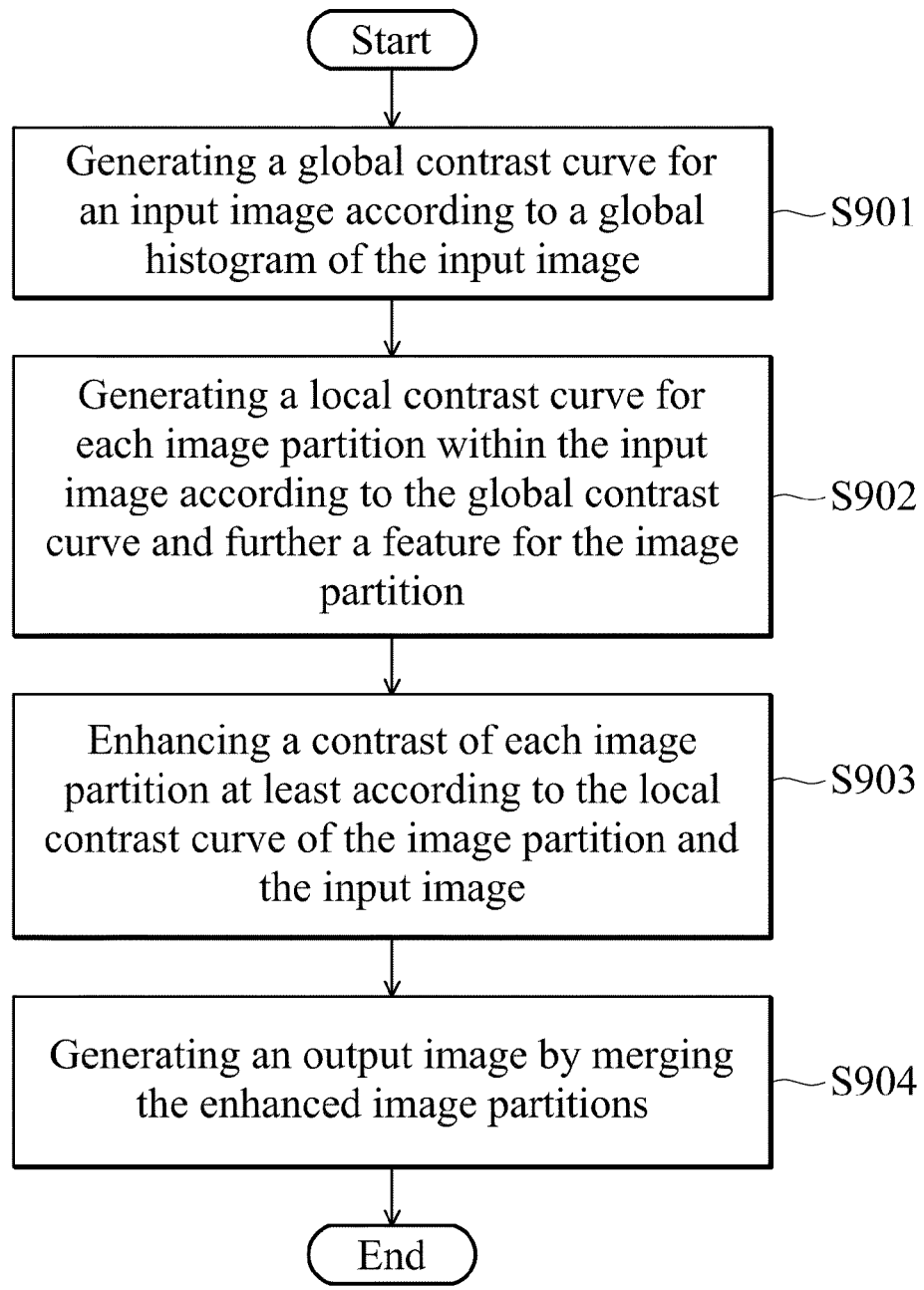
FIG. 9 shows a flow chart of an image processing method according to an embodiment of the invention.

After obtaining the contrast adjusting values of the pixels within the image partition, the image generator 103 compensates (or adjusts) a pixel value of each pixel of the image partition according to the corresponding contrast adjusting value so as to enhance the image partition. When all image partitions are enhanced, the image generator 103 merges the enhanced image partitions to generate the output image $S_{OUT}$. FIG. 9 shows a flow chart of an image processing method according to an embodiment of the invention. Firstly, generating a global contrast curve for an input image according to a global histogram of the input image (Step S901). Next, generating a local contrast curve for each image partition within the input image according to the global contrast curve and further a feature for the image partition (Step S902). Next, enhancing a contrast of each image partition at least according to the local contrast curve of the image partition and the input image (Step S903). Finally, an output image is generated by merging the enhanced image partitions (Step S904).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image enhancement apparatus, comprising:
    a global contrast curve generator generating a global contrast curve for an input image according to a global histogram of the input image;
    a local contrast curve generator generating a local contrast curve for each image partition within the input image according to the global contrast curve and further a feature of the image partition; and
    an image generator generating an output image by enhancing a contrast of each image partition according to the local contrast curve for the image partition, the input image and further one or more local contrast curves for one or more image partitions adjacent to image partition, and merging the enhanced image partitions, and
    wherein the image generator further comprises:
    a blender obtaining a contrast adjusting value for each pixel in the image partition by blending the local contrast curves of the image partition and the one or more adjacent image partitions according to the distances between the pixel and the image partition and the one or more adjacent image partitions; and
    the image generator generating the output image by compensating each pixel in the image partition with the corresponding contrast adjusting value to enhance the contrast of each image partition, and merging the enhanced image partitions.

2. The image enhancement apparatus as claimed in claim 1, wherein the global contrast curve generator further comprises:
    a global histogram analyzer analyzing the input image to obtain the global histogram.

3. The image processing apparatus as claimed in claim 1, wherein the local contrast curve generator further comprises:
    an image divider dividing the input image into a plurality of image partitions;
    a local feature calculator calculating the feature of each image partition by filtering the image partition.

4. The image enhancement apparatus as claimed in claim 3, wherein the local feature calculator filters the image partition to generate a filtered partition and outputs the sum of pixels in the filtered partition as the feature of the image partition.

5. The image enhancement apparatus as claimed in claim 1, wherein the local contrast curve generator generates the local contrast curve for the image partition by adjusting a curvature of the global contrast curve according to the feature of the image partition.

6. An image enhancement method implemented by an apparatus, comprising:
    generating a global contrast curve for an input image according to a global histogram of the input image by the apparatus;
    generating a local contrast curve for each image partition within the input image according to the global contrast curve and further a feature for the image partition by the apparatus; and
    generating an output image by enhancing a contrast of each image partition according to the local contrast curve of the image partition, the input image and further one or more local contrast curves for one or more image partitions adjacent to image partition, and merging the enhanced image partitions by the apparatus, and
    wherein the step of generating the output image by enhancing the contrast of each image partition according to the local contrast curve of the image partition, the input image and further one or more local contrast curves for one or more image partitions adjacent to image partition, and merging the enhanced image partitions comprises:
    obtaining a contrast adjusting value for each pixel in the image partition by blending the local contrast curves of the image partition and the one or more adjacent image partitions according to the distances between the pixel and the image partition and the one or more adjacent image partitions; and
    generating the output image by compensating each pixel in the image partition with the corresponding contrast adjusting value to enhance the contrast of each image partition, and merging the enhanced image partitions.

7. The image enhancement method as claimed in claim 6, wherein the feature of the image partition is generated by the step:
    dividing the input image into a plurality of image partitions by the apparatus; and
    calculating the feature of the image partition by filtering the image partition by the apparatus.

8. The image enhancement method as claimed in claim 7, wherein the step of calculating the feature of the image partition by filtering the image partition comprise:
    filtering the image partition to generate a filtered partition by the apparatus; and
    outputting the sum of pixels in the filtered partition as the feature of the image partition by the apparatus.

9. The image enhancement method as claimed in claim 6, wherein the local contrast curve for the image partition is generated by adjusting a curvature of the global contrast curve according to the feature of the image partition.

* * * * *